Patented June 30, 1953

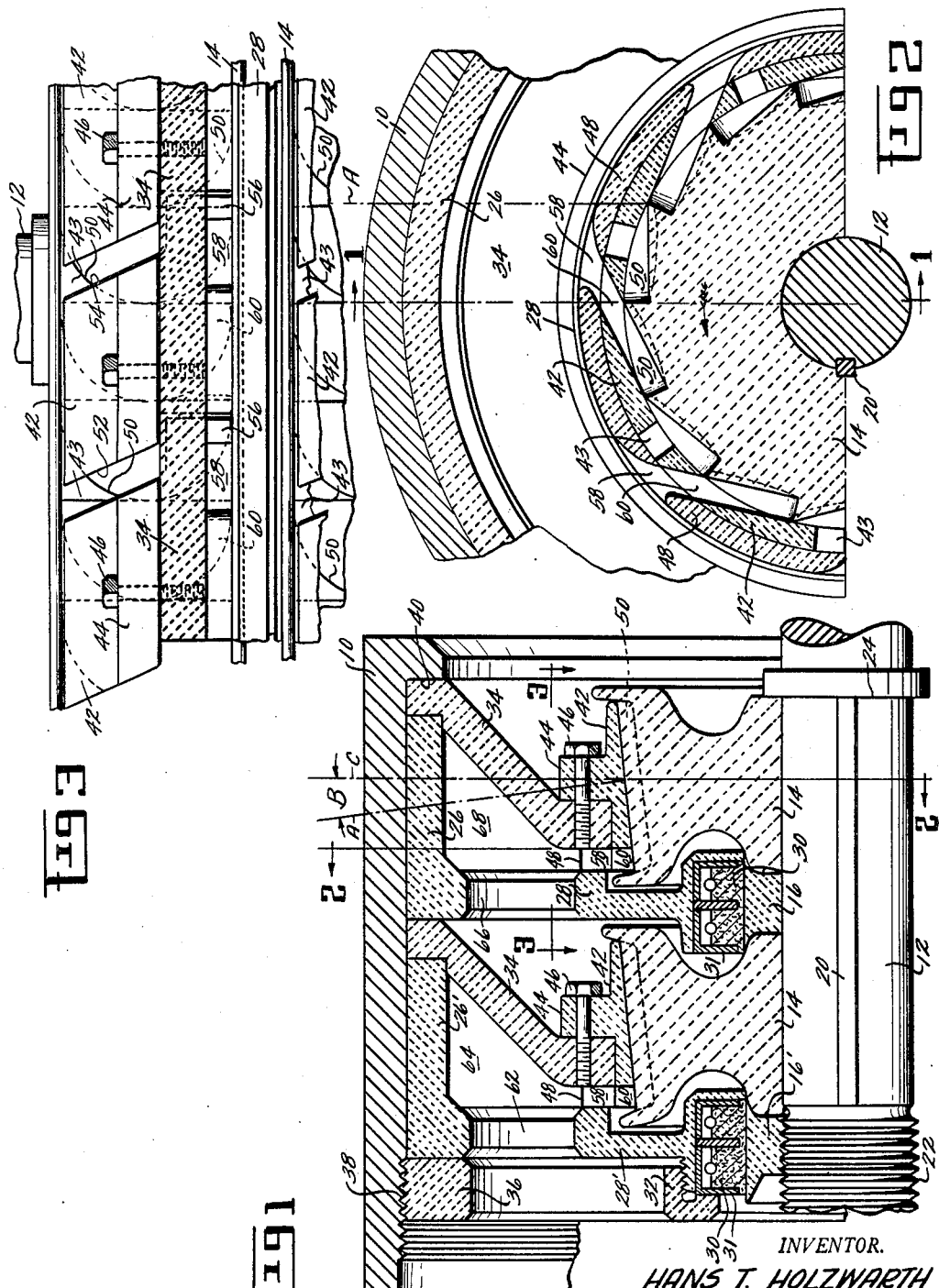

2,643,852

UNITED STATES PATENT OFFICE 2,643,852

HIGH-SPEED TURBINE

Hans T. Holzwarth, Westfield, N. J., assignor to the United States of America as represented by the Secretary of the Air Force Application January 9, 1950, Serial No. 137,615

6 Claims. (Cl. 253—48)

This invention relates to elastic fluid turbines and particularly to turbines of that type in which the high temperature level of the driving fluid indicates the use of ceramic material for all parts of the turbine which are exposed to the high temperature fluid.

The embodiment of the invention herein shown departs from the conventional impulse turbine wherein the rotor is provided with a plurality of semicircular buckets milled in a solid steel disc leaving thin partition walls between the buckets, and proposes instead to omit the partition wall between buckets which confines the fluid flow although retaining the semicircular shape, the buckets being formed in the rotor somewhat like the teeth of a ratchet and the fluid flow being confined by stationary shroud members, substantially all of the several parts except the outer casing lending themselves to production in ceramics.

An object of this invention is to provide a turbine structure having diaphragms, nozzles, wheels, buckets and shrouds all of simple configuration such as will not pose any problem in their manufacture of ceramic material.

Another object is to so design the several ceramic parts that one will support the next to the end that no undesirable stresses will be set up in the parts by bolting or clamping them into position.

Other objects and advantages will appear as the invention is described in detail, reference being had to the drawings, wherein Fig. 1 is an axial half section taken at 1—1 of Fig. 2 through a turbine built in accordance with my invention.

Fig. 2 is a transverse section taken at 2—2 of Fig. 1.

Fig. 3 is a fragmentary developed view taken on an arc 3—3 of Fig. 1 around the center of the shaft showing the development of several of the buckets of the wheel, several of the shroud segments and several of the nozzles.

Like reference characters refer to like parts throughout the several views.

Referring to the axial section Fig. 1, a stationary cylindrical housing 10, preferably of high-heat resisting steel, has coaxially supported therein by bearings (not shown) a rotatable shaft 12. Shaft 12 carries two identical wheel discs 14, and the two inner or rotatable sealing gland members 16 and 16'. A spline 20 prevents relative rotation between the shaft 12 and parts 14, 16', and 16 while an external-internal thread 22 serves, by rotation of the part 16', to press the assembled turbine wheel parts against the shaft shoulder 24 thereby maintaining correct spaced relation of the several parts.

Concentrically positioned in the housing 10 are two diaphragms 26 and 26' around the central openings of which are formed the outer or non-rotatable sealing gland parts 28 and 28' which are complementary to the inner or rotatable sealing gland parts 16 and 16'. A gland case 31 containing sealing rings 30 is held in place and held against rotation by gland nut 32 threaded on the hub of the part 28' of the diaphragm 26'.

Two identical diaphragms 34 are concentrically positioned in the housing 10. A nut 36 threadedly engages the housing 10 at 38 thereby to clamp diaphragms 26, 26' and both diaphragms 34 against the shoulder 40 in the housing. Keys (not shown) may be provided in the housing and the diaphragms to prevent relative rotation between the diaphragms and the housing. Each diaphragm 34 has a central opening to which are fitted identical shroud segments 42 circumferentially spaced apart around the inner periphery of the opening leaving spaces 43 therebetween. Each shroud segment 42 has an outwardly extending lug 44 through which a screw 46 extends into a threaded opening in the diaphragm 34 to hold the shroud segments in place.

Each diaphragm 34 has an integral hub 48 extending laterally at its inner periphery, the outer radius of the shroud segments 42 being fitted tightly up to the bore of the hub and extending all the way through the bore of the diaphragm 34 including the bore of the integral hub 48.

If the material from which the wheel discs are made is such that it can be machined, the wheel buckets 50 may be formed with an end mill of a diameter equal to the width of the floor of the buckets, the end mill being sunk to such a depth that the floor of the buckets are semicircular as seen in Fig. 3, the axis A of the end mill being in a plane which is parallel with the plane of the vertical center line 1—1 of Fig. 2 but inclined at an angle B with respect to the vertical line C of Fig. 1, which makes the floor of a bucket higher at the discharge side than at the receiving side whereby spillage of fluid over the discharge side is retarded.

The inner surface of the shroud segments 42 are arcs of circles and are fitted as closely as practicable to the outside of the bucket wheels 14. The ends of the shroud segments which cover the buckets 50 are angled at 52 and 54 as seen in Fig. 3. An arm 56 is provided to house the nozzle slots 58, 60, the part 58 of a nozzle being formed in the edge of the hub 48 of the diaphragm 34 and the part 60 being formed in the edge of the shroud segment. In the embodiment of the invention herein shown, the nozzle slots are so cut that if the forward edge of any bucket is placed to coincide with the vertical line 1—1 as seen in Fig. 2, the bottom of a nozzle slot and the bottom of the next bucket will be coplanar.

In operation the pressure fluid enters through openings 62 in the diaphragm 26 into the inlet ring 64 and through the nozzles 58, 60 into the buckets 50 of the first wheel 14, through buckets 50 and out through spaces 43 between shroud segments 42, then through openings 66 in the second diaphragm 26 into the second inlet ring 68 and through the second set of nozzles 58, 60 and buckets 50 and spaces 43 to the discharge side of the turbine.

While in the illustrative embodiment of the invention herein disclosed I show a two-stage turbine, it will of course be understood that the design is adaptable to a single stage or a greater number of stages as conditions warrant, and while the design shown is particularly adaptable to the use of ceramic material for the parts which come into contact with the operating fluid, where operating conditions are less severe the same parts may be made of steel or other appropriate metal.

For convenience the drawings show twice as many buckets as there are nozzle slots, but this proportion need not necessarily be maintained, since one less or one more bucket than shown may be desirable to better distribute the impulses.

Having described an embodiment of my invention, I claim:

1. An elastic fluid turbine comprising a housing, a shaft centrally disposed in said housing, a bucket wheel of ceramic material fast on said shaft for rotation therewith, buckets formed in said ceramic on said bucket wheel, an axially-transverse section through said buckets midway of their axial width being in the form of ratchet teeth and the bottoms of said buckets being semicircular in plan view, a ceramic diaphragm having inlet openings enclosing the inlet end of said housing, a second ceramic diaphragm axially spaced from the first leaving an inlet ring therebetween, shroud means of ceramic material overlying said buckets carried at the inner periphery of said second ceramic diaphragm constructed for confining the elastic fluid to the buckets, and tangential nozzles formed in said shroud means forming a connecting passage from the inlet ring to the buckets at the extreme forward edge of said buckets.

2. An elastic fluid turbine comprising a housing, a shaft centrally disposed in said housing, a bucket wheel of ceramic material fast on said shaft for rotation therewith, buckets formed in said ceramic on said bucket wheel, an axially transverse section through said buckets midway of their axial width being in the form of ratchet teeth and the bottoms of said buckets being semicircular in plan view, a ceramic diaphragm having inlet openings enclosing the inlet end of said housing, a second ceramic diaphragm axially spaced from the first leaving a ringlike fluid inlet space therebetween, a hub carried by one of said ceramic diaphragms filling the space between the two said ceramic diaphragms, shroud means of ceramic material carried at the inner periphery of said second ceramic diaphragm overlying said buckets and constructed for confining the elastic fluid to the buckets, and tangential nozzles formed in the side of said hub forming a connecting passage from the inlet ring to the buckets at the extreme forward edge of said buckets.

3. An elastic fluid turbine comprising a cylindrical housing, a shaft centrally disposed for rotation in said housing, a ceramic bucket wheel fast on said shaft for rotation therewith, buckets formed on said ceramic bucket wheel, an axially-transverse section through said buckets midway of their axial width being in the form of ratchet teeth and the bottoms of said buckets being semicircular in plan view, a ceramic diaphragm having fluid inlet openings enclosing the inlet end of said housing, a second ceramic diaphragm axially spaced from the first leaving a fluid inlet ring therebetween, a hub carried by said second ceramic diaphragm spanning the space between the two said diaphragms, shroud segments at the inner periphery of said second ceramic diaphragm overlying said buckets and shaped to confine the elastic fluid to the buckets, and tangential nozzles formed in the end of said hub and said segments forming a connecting passage from the inlet ring to the buckets at the extreme forward edge of said buckets.

4. The device defined in claim 3 wherein the buckets are deeper at the inlet end than at the discharge end.

5. An elastic fluid turbine comprising a cylindrical housing, a shaft centrally disposed and arranged in said housing for rotation therein, a ceramic bucket wheel fast on said shaft for rotation therewith, buckets so formed on the outer periphery of said bucket wheel that a section taken on a plane normal to the axis of the wheel through said buckets midway of their axial measurement will be in the form of ratchet teeth and the bottoms of said buckets will be semicircular in plan view, a ceramic diaphragm having inlet openings enclosing the inlet end of said cylindrical housing, a second ceramic diaphragm axially spaced from the first leaving a fluid inlet ring therebetween, an integral hub around the inner periphery of the second ceramic diaphragm extending to and being in contact with the first ceramic diaphragm, shroud means carried at the inner periphery of said second ceramic diaphragm and said hub constructed and arranged for confining the elastic fluid to the buckets, and tangential nozzles formed in the ends of said hub and said segments forming a connecting passage from the inlet ring to the buckets at the extreme forward edge of said buckets.

6. An elastic fluid turbine comprising a cylindrical housing, a shaft concentrically disposed and arranged in said housing for rotation therein, a ceramic bucket wheel with integral buckets fast on said shaft for rotation therewith, the buckets being semicircular in plan and formed like ratchet teeth in a central transverse cross section, and tilted with respect to the axis of the wheel so that the floor of the bucket is at a greater distance from the wheel axis at the discharge end than at the inlet end, a ceramic diaphragm having inlet openings enclosing the inlet end of said cylindrical housing, a second ceramic diaphragm axially spaced from the first leaving a fluid inlet ring therebetween, an integral hub around the inner periphery of the second ceramic diaphragm extending to and being in contact with the first ceramic diaphragm, shroud means carried at the inner periphery of said second ceramic diaphragm and said hub constructed and arranged for confining the elastic fluid to the buckets, and tangential nozzles formed in the ends of said hub and said segments forming a connecting passage from the inlet ring to the buckets at the extreme forward edge of said buckets.

HANS T. HOLZWARTH.

References Cited in the file of this patent

UNITED STATES PATENTS

| Number | Name | Date |
| --- | --- | --- |
| 800,684 | Schneider | Oct. 3, 1905 |
| 802,122 | Sunderland | Oct. 17, 1905 |
| 821,051 | Moore | May 22, 1906 |
| 911,577 | Dake | Feb. 9, 1909 |
| 1,047,918 | Collier | Dec. 24, 1912 |
| 2,308,233 | Schutte | Jan. 12, 1943 |
| 2,334,249 | Carlson | Nov. 16, 1943 |

FOREIGN PATENTS

| Number | Country | Date |
| --- | --- | --- |
| 9,417 | Great Britain | 1904 |

OTHER REFERENCES

American Inventor, April 1906, Vol. 15, No. 4, page 101. Published at 114 Liberty St., New York, New York. (A copy is in Division 9 of the U. S. Patent Office.)